United States Patent
Wu

(10) Patent No.: US 6,613,377 B2
(45) Date of Patent: Sep. 2, 2003

(54) WHEY TREATMENT PROCESS FOR ACHIEVING HIGH CONCENTRATION OF α-LACTALBUMIN

(75) Inventor: Chao Wu, Ames, IA (US)

(73) Assignee: AMPC, Ames, IA (US)

( * ) Notice: Subject to any disclaimer, the term of this patent is extended or adjusted under 35 U.S.C. 154(b) by 0 days.

(21) Appl. No.: 10/011,951

(22) Filed: Nov. 5, 2001

(65) Prior Publication Data

US 2002/0044998 A1 Apr. 18, 2002

Related U.S. Application Data

(62) Division of application No. 09/356,124, filed on Jul. 16, 1999, now Pat. No. 6,312,755.

(51) Int. Cl.[7] .............................. A23J 1/00; A23J 1/02; A23C 17/00
(52) U.S. Cl. ........................ 426/656; 426/583; 426/657; 530/366; 530/386
(58) Field of Search ................................. 426/656, 583, 426/657; 530/366, 386

(56) References Cited

U.S. PATENT DOCUMENTS

| | | | |
|---|---|---|---|
| 4,485,040 A | 11/1984 | Roger et al. |
| 4,782,138 A | 11/1988 | Rialland et al. |
| 5,008,376 A | 4/1991 | Bottomley |
| 5,007,067 A | 12/1991 | Thibault |
| 5,420,249 A | 5/1995 | de Wit et al. |
| 5,455,331 A | 10/1995 | Pearce |
| 5,503,864 A | 4/1996 | Uchida et al. |
| 5,756,680 A | 5/1998 | Ahmed et al. |

FOREIGN PATENT DOCUMENTS

| EP | 0311283 | 4/1989 |
|---|---|---|
| GB | 1405484 | 9/1975 |

OTHER PUBLICATIONS

M. Outinen, O. Tossavainen and E.–L. Syvaoja; Chromatographic Fractionation of α–Lactalbumin and β–Lactoglobulin With Polystyrenic Strongly Basic Anion Exchange Resins; 1995; pp. 340–343;Academic Press Limited.

S.A. Al–Mashikh and S. Nakai; Reduction of Beta–Lactoglobulin Content of Cheese Whey By Polyphosphate Precipitation; 1987; pp. 1237–1240; Vancouver, B.C., Canada.

R. K. Owusu; The Effect Of Calcium On Bovine αLactalbumin Conformational Transitions By Ultraviolet Difference And Fluorescence Spectrophotometry; 1991; pp. 41–45; England.

R. K. Owusu; Thermodynamic Analysis Of The Effect Of Calcium On Bovine Alpha–Lactalbumin Conformational Stability; 1992; pp. 189–194; England.

T. Kaneko, B. T. Wu, and S. Nakai; Selective Concentration Of Bovine Immunoglobulins and α–Lactalbumin From Acid Whey Using $Feci_3$; 1985; pp. 1531–1536; Canada.

P. Mailliart and B. Ribadeau–Dumas; Preparation of β–Lactoglobulin And β–Lactoglobulin–Free Proteins From Whey Retentate By Naci Salting Out At Low PH; 1988; pp. 743–745; 752, France.

J. I. Mate & J.M. Krochta; Large–Scale Procedure For The Separation of β–Lactoglubulin From Whey Protein Isolate; 1994; p. 129; California.

R. J. Pearce; Thermal Separation Of β–Lactoglobulin And α–Lactalbumin In Bovine Cheddar Cheese Whey; 1983; pp. 144–149; Australia.

C Bramaud[1], P. Aimar[2], G. Daufin[1]; Optimisation Of A Whey Protein Fractionation Process Based On The Selective Precipitation of α–Lactalbumin; 1997; pp. 411–423; France.

C Bramaud[1], P. Aimar[2], G. Daufin[1]; Thermal Isoelectric Precipitation Of α–Lactalbumin From A Whey Protein Concentrate: Influence Of Protein–Calcium Complexation; 1995; pp. 121–130; France.

Jayaprakasha, H.M., "Permeation Behaviour Of Buffalo Milk Cheddar Cheese Whey During Ultrafiltration", Z Lebensm Unters Forsch, European Food Research and Technology 198(3):234–238 (1994) Abstract XO999856914.

Maubois, J.I., "Industrial Fractionation of Main Whey Proteins", J. Journal, Bulletin of the International Dairy Federation (1987) Abstract XP–002149957.

*Primary Examiner*—Anthony J. Weier
(74) *Attorney, Agent, or Firm*—McKee, Voorhees & Sease, P.L.C.

(57) ABSTRACT

A method of making an α-lactalbumin enriched whey protein product is described. The method involves the treatment of a whey protein product with an acid to lower the pH of the whey protein product to 4.0 or below. This pH-lowering step allows the α-lactalbumin molecules to be concentrated more efficiently.

4 Claims, No Drawings

WHEY TREATMENT PROCESS FOR ACHIEVING HIGH CONCENTRATION OF α-LACTALBUMIN

This is a divisional application of U.S. Ser. No. 09/356,124, filed Jul. 16, 1999, now U.S. Pat. No. 6,312,755.

FIELD OF THE INVENTION

This invention relates to a method for retaining the nutritive properties of whey. Specifically, this invention relates to the treatment of whey to enrich the α-lactalbumin fraction.

BACKGROUND OF THE INVENTION

Whey is the liquid component of milk. During the process of making milk into cheese, whey protein is separated from the curds. Whey is a dilute liquid containing lactose, proteins, salts, and residual fat.

Until recently, a major portion of commercially produced whey was discarded, causing major environmental pollution problems. With the advent of stricter environmental controls and regulations, whey proteins have been reexamined for their utility in the pharmaceutical, dietetic and food industries. Whey proteins have become more heavily incorporated into ice cream, bread, canned soup, infant formulas, and various other food products. Whey is also used as a livestock feed.

Whey proteins possess interesting nutritional, functional, physiological, and pharmaceutical properties. The proteins in whey are divided into two principal groups: 1) the globulin protein fraction containing mainly β-lactoglobulin (β-lg) and immunoglobulins (Ig); and 2) the albumin fraction including α-lactalbumin (α-La) and serum albumin. α-La typically constitutes about 40% by weight of the total proteins in human milk, while cow's milk contains only about 4–5% α-La by weight of the total proteins.

Whey proteins have been used in infant formula and as a protein source in nutritional mixtures for humans and animals. Since β-lg is not a protein found in human breast-milk, it acts as an allergen to infants. It is therefore desirable for whey proteins in breast-milk substitutes to have either a low concentration of β-lg to reduce the concentration of allergen or a relatively high concentration of α-La to make it more similar to human milk.

Recent methods of preparing α-La enriched fractions from milk or whey have included ultrafiltration, heat precipitation, and ion exchange methods. Ultrafiltration methods use membranes which will allow only molecules up to a given size to pass through into the permeate. U.S. Pat. No. 5,008,376 to Bottomley describes a α-La separation technique using ultrafiltration. Heat precipitation methods involve the application of heat to the whey at a given pH range for a time period sufficient to promote the flocculation of α-La. Such heat precipitation methods are described in U.S. Pat. No. 5,455,331 to Pearce. Ion exchange methods involve contacting the whey with an anion or cation exchanger so as to selectively retain a protein fraction. Such a process is described in U.S. Pat. No. 5,077,067 to Thibault.

The present inventor has now determined that adjusting the pH of the whey to a more acidic level during processing, causes a change in protein conformation and improved retention of the α-La during later processing. This change in comformation and improved retention provides a high concentration of α-La in the protein fraction without the need for heat processing or other expensive separation processes.

Accordingly, it is a primary objective of the present invention to provide a method and means of processing whey to obtain a protein fraction having a high concentration of α-lactalbumin.

It is a further objective of the present invention to provide a method and means of processing whey to obtain a protein fraction having a low concentration of β-lactoglobulin.

It is yet a further objective of the present invention to provide a method and means of processing whey which does not necessitate the application of high temperatures.

It is still a further objective of the present invention to provide a method and means of processing whey to achieve a high concentration of α-La in the protein fraction which is convenient and economical to use.

The method and means of accomplishing each of the above objectives as well as others will become apparent from the detailed description of the invention which follows hereafter.

SUMMARY OF THE INVENTION

The invention describes a method of processing whey to obtain a filtrate or precipitate having a high concentration of α-lactalbumin. The method involves the addition of an acid during the processing method to lower the pH of the whey to less than 4.0, with a preferred pH range being from about 3.3–3.8. The pH adjustment results in an enriched α-lactalbumin fraction after further processing. This pH adjustment process may be accommodated to membrane filtration and precipitation methods.

DETAILED DESCRIPTION OF THE PREFERRED EMBODIMENT

The present invention relates to a method and means for processing whey to obtain a protein fraction having an increased concentration of α-lactalbumin (α-La). The invention consists of the addition of an acid during the whey processing steps to obtain a pH of 4.0 or less.

α-La contains 1 mol of bound calcium per mol of protein. Hiraoka et al. (1980), α-lactalbumin: A calcium metalloprotein. Biochem. Biophys. Res. Comm. 95:1098–1104. This atom of calcium stabilizes the tertiary structure of the protein. It has been found that the binding of calcium to the α-La molecule is pH dependent, especially below pH 5. Braumaud et al. (1995): Thermal Isoelectric Precipitation of α-Lactalbumin from a Whey Protein Concentrate: Influence of Protein-Calcium Complexation. Biotech. and Bioengin. 47:121–130. At pH 1.7, α-La does not bind calcium any longer. Id.

The present inventor has now unexpectedly discovered that when the pH of the α-La molecule is lowered below 4.0, the molecule changes, and behaves as a much larger protein. This phenomenon in turn allows for recovery of an enriched α-La fraction during membrane filtration. This pH lowering also causes the α-La molecule to release calcium. Once this calcium is removed, the α-La can be effectively precipitated to form a α-La concentrate.

As used herein, the term "whey protein product" refers to cheese or acid casein whey, or to a whey protein concentrate obtained from the whey. The whey protein concentrate may also be a whey protein powder. If a whey protein powder is used as starting product, the powder must be brought into solution prior to Applicant's pH lowering step described below.

Applicant's process involves the treatment of whey protein concentrate to further concentrate the α-La proteins using either a precipitation or membrane filtration process. The whey protein concentrate starting product may be prepared in any conventional way. For example, the whey protein concentrate may be obtained from skimmed and/or clarified whey. The whey may be concentrated and/or desalted by common means, e.g. by ultrafiltration and/or diafiltration.

Whey is typically obtained during the cheese making or casein process as a result of whey separation and clarification from casein. The whey produced from cheese-making is generally referred to as "sweet whey" while whey from cottage cheese sources and acid casein is referred to as "acid whey". The whey source is preferably bovine, however the milk source may be from any mammal, including goats, sheep, buffalo, water buffalo, yak, rabbit, human, llama, and mouse.

The whey is preferably pasteurized, although it does not have to be pasteurized to be processed in accordance with this invention. Such pasteurization conditions are well known by persons skilled in the art.

In the filtration process, the whey is first concentrated through ultrafiltration using a 10K-100K molecular weight cut-off membrane (MWCO). The portion which passes through the membrane is known as the ultrafiltrate or permeate, while the larger molecules that are retained are known as the retentate. The permeate is processed in accordance with this invention, while the retentate may be dried as whey protein concentrate (WPC). Ultrafiltration of the whey may be performed using any of the ultrafilter housings and membranes known in the art, including hollow fiber or spiral membranes. While temperature is not a critical factor, ultrafiltration is generally conducted at a temperature of between about 5 to 55° C., with preferred temperature ranges of 5–10° C. or 45–55° C. So long as the pH is maintained within its natural range of between about 4.6–6.2, pH is not critical in this step.

Diafiltration is optionally performed following the ultrafiltration process if a high protein WPC is desired. Diafiltration includes the injection of water into the whey stream to remove excess lactose and soluble minerals present into the permeate and further concentrate the proteins. Deionized water is preferred for use in this process. The diafiltration may be performed using known techniques, such as constant volume diafiltration or batch diafiltration.

Applicant's invention next involves the unique pH-adjustment step which causes the α-La molecule to change its conformation and behave like a much larger molecule. Prior to this step, the pH of the permeate ranges from about 5.5–6.5. This pH is slightly lower if the whey source is acid whey, whereby the whey protein concentrate will have a pH of about 4.6.

In the pH-lowering step, the permeate obtained above is mixed with a sufficient amount and concentration of acid to decrease the pH of the permeate to 4.0 or below. The pH is preferably lowered to a range of between about 3.3–3.8, with about 3.5 being most preferred. The acid is preferably a food grade acid, such as hydrochloric acid, phosphoric acid, citric acid, and sulfuric acid. The preferred acid is hydrochloric acid. Temperature is not critical in this step.

Once the pH of the whey protein concentrate is lowered to 4.0 or below, the present inventor has surprisingly found that, once the pH is lowered, the α-La molecule behaves like a much larger molecule. Specifically, at a pH of 4.0 or below, α-La molecules will be retained on the same ultrafiltration membrane that they originally passed through at the higher pH.

Once the pH of the permeate is lowered to 4.0 or below, the permeate is preferably concentrated through ultrafiltration using a 10K-100K MWCO membrane. The α-La concentrate obtained may then be dried as-is, or neutralized to a pH of 6–7. Acceptable bases for this purpose include NaOH, KOH, and other alkaline bases. Such bases are readily ascertainable by those skilled in the art.

Drying the α-La concentrate allows for easier packaging and the product remains stable for a longer period of time than the raw concentrate in liquid or frozen form. Approximately 25–70% of the protein in the powder is α-La. The α-La concentrate may be included in a variety of foods, supplements, infant formulas, etc. as previously described herein in appropriate concentrations.

In the precipitation technique of this invention, the starting material can be cheese or acid casein whey or the same whey concentrated through ultrafiltration using a 5–50K MWCO membrane to provide a whey protein concentrate having from about 30–80% protein on a solids basis. The pH of the unconcentrated or concentrated whey is then lowered to pH 4.0 or below as already described above. This pH lowering step causes the calcium ions to disassociate from the α-La molecules.

The retentate is then ultrafiltered, and optionally diafiltered with deionized water until the calcium to protein ratio is less than about 0.001, and preferably less than about 0.0004. Removal of the calcium ions in this step allows the α-La molecules to become more concentrated in the precipitation step. Again, while temperature is not critical, the ultrafiltration and diafiltration steps may generally be carried out at a temperature range of between about 5–55° C., and preferably at 5–10° C. or 45–55° C.

Precipitation of α-La and other proteins is induced by diluting the retentate with deionized water. The purpose of dilution is to facilitate precipitate formation and promote subsequent separation. The retentate is diluted until it contains from about 2–12% protein, and preferably from about 4–10% protein. The pH is then adjusted to a range of 4–5, and a preferred range of 4.5–4.7. Many alkali agents, such as NaOH and KOH, can be used for this purpose. The dilution and pH adjustment steps are performed in a temperature range of between about 10–55° C., preferably 25–40° C. The precipitation is normally complete within 2 hours.

The precipitated proteins (α-La, BSA, Ig) can be separated from the soluble proteins (β-lactoglobulin and casein peptides) by centrifugation or microfiltration. The precipitate stream is α-La-enriched and can be dried or neutralized as described above. The stream containing the soluble proteins is low in fat and can be made into whey protein isolate after further concentration.

The membrane filtration and precipitation processes described offer the advantage of being performed without the necessity for a heat treatment or other expensive processes, while successfully achieving a high concentration of α-La.

The α-La concentrate of this invention may be included in a variety of food products, especially nutritional formulas. Such formulas include infant formulas, adult nutritional formulas, sport formulas, medical formulas, and enteral formulas.

While these food products are conventionally formulated in a liquid form, it is contemplated that they can also be contained in a variety of other oral dosage forms. In general, in addition to the α-La concentrate, the pharmaceutical compositions of this invention may contain suitable excipients and auxiliaries which facilitate processing of the active compounds into preparations which can be used pharmaceutically. Oral dosage forms encompass tablets, capsules, powders, suspensions, emulsions, granules, and feed supplements.

The pharmaceutical preparations of the present invention are manufactured in a manner which is itself well known in the art. For example the pharmaceutical preparations may be made by means of conventional mixing, granulating, dissolving, and lyophilizing processes. The processes to be used will depend ultimately on the physical properties of the active ingredient used.

Suitable excipients are, in particular, fillers such as sugars for example, lactose or sucrose mannitol or sorbitol, cellulose preparations and/or calcium phosphates, for example, tricalcium phosphate or calcium hydrogen phosphate, as well as binders such as starch, paste, using, for example, maize starch, wheat starch, rice starch, potato starch, gelatin, gum tragacanth, methyl cellulose, hydroxypropylmethylcellulose, sodium carboxymethylcellulose, and/or polyvinyl pyrrolidone. If desired, disintegrating agents may be added, such as the above-mentioned starches as well as carboxymethyl starch, cross-linked polyvinyl pyrrolidone, agar, or alginic acid or a salt thereof, such as sodium alginate. Auxiliaries are flow-regulating agents and lubricants, for example, such as silica, talc, stearic acid or salts thereof, such as magnesium stearate or calcium stearate and/or polyethylene glycol. Dragee cores may be provided with suitable coatings which, if desired, may be resistant to gastric juices.

For this purpose concentrated sugar solutions may be used, which may optionally contain gum arabic, talc, polyvinylpyrrolidone, polyethylene glycol and/or titanium dioxide, lacquer solutions and suitable organic solvents or solvent mixtures. In order to produce coatings resistant to gastric juices, solutions of suitable cellulose preparations such as acetylcellulose phthalate or hydroxypropylmethylcellulose phthalate, dyestuffs and pigments may be added to the tablet of dragee coatings, for example, for identification or in order to characterize different combination of compound doses.

Other pharmaceutical preparations which can be used orally include push-fit capsules made of gelatin, as well as soft, sealed capsules made of gelatin and a plasticizer such as glycerol or sorbitol. The push-fit capsules can contain the active compounds in the form of granules which may be mixed with fillers such as lactose, binders such as starches, and/or lubricants such as talc or magnesium stearate and, optionally, stabilizers. In soft capsules, the active compounds are preferably dissolved or suspended in suitable liquids, such as fatty oils, liquid paraffin, or liquid polyethylene glycols. In addition, stabilizers may be added. Possible pharmaceutical preparations which can be used rectally include, for example, suppositories, which consist of a combination of the active compounds with the suppository base. Suitable suppository bases are, for example, natural or synthetic triglycerides, paraffin hydrocarbons, polyethylene glycols, or higher alkanols. In addition, it is also possible to use gelatin rectal capsules which consist of a combination of the active compounds with a base. Possible base materials include for example liquid triglycerides, polyethylene glycols, or paraffin hydrocarbons. Optionally, the suspension may also contain stabilizers.

The following examples are offered to illustrate but not limit the invention. Thus, they are presented with the understanding that various formulation modifications as well as method of delivery modifications may be made and still be within the spirit of the invention.

EXAMPLE 1

Preferred Filtering Process For Manufacture of α-La Concentrate

The following is a flowchart illustrating a preferred method of manufacturing α-La concentrate in accordance with the present invention using ultrafiltration:

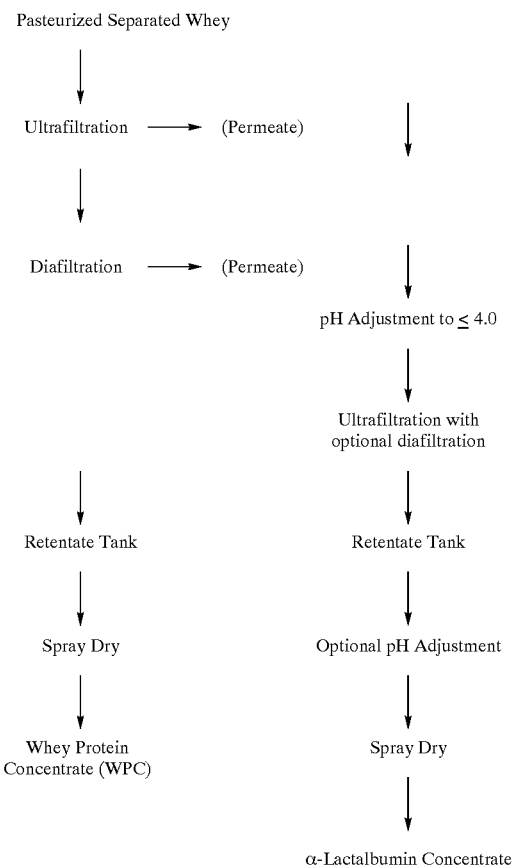

EXAMPLE 2

Preferred Precipitation Process for Manufacture of α-La Concentrate

The following is a flowchart illustrating a preferred method of manufacturing α-La concentrate in accordance with the present invention:

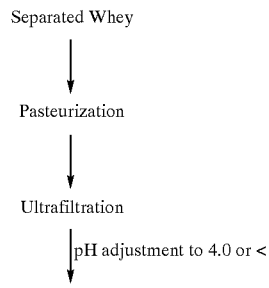

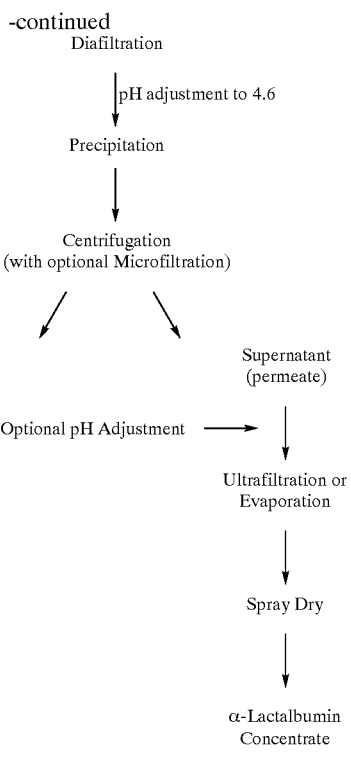

EXAMPLE 3

Preferred Precipitation Process for Manufacture of α-La Concentrate

Cheddar cheese whey was concentrated to 8 VCF (volume concentration factor) through a commercial ultrafiltration plant with 10K molecular weight cut-off. A sample of retentate (18 l) was adjusted to pH 3.5 with 6N HCl and concentrated through ultrafiltration using an Amicon S10Y30 membrane until total solids=15%. The retentate was continuously diafiltered with 4 volumes of deionized water while maintaining a constant volume of retentate. Total solids at the end of diafiltration was 11.6%. The retentate was further concentrated through ultrafiltration using the same membrane until the total solids=18%. The final retentate volume was 3.5 l. The retentate was diluted to 7 l with deionized water, adjusted to 35° C. and pH 4.6 with 5N NaOH/KOH mixture, and incubated at 35° C. for one hour. It was then centrifuged at 3000×g for 15 minutes.

Pooled supernatant was adjusted to pH 7.0 with 5N KOH and spray-dried. The powder contained 83% protein, and 0.4% fat by weight.

The precipitate from the second centrifugation was resuspended in 2.5 l of deionized water, adjusted to pH 7.0 with 5N KOH and spray-dried. The powder contained 76% protein and 9.7% fat by weight. The α-La level was 28.4% by weight of the protein.

EXAMPLE 4

Preferred Precipitation Process for Manufacture of α-La Concentrate

Cheddar cheese whey was concentrated to 10 VCF through a commercial ultrafiltration plant with 10K molecular weight cut-off membrane and diafiltered using the same membrane until the protein concentration was 80% of the total solids. To 172 l retentate at 29 Brix, 282 l deionized water was added. The temperature was adjusted to 45° C. and pH to 3.5 with 6N HCl. This solution was continuously diafiltered while maintaining constant retentate volume of 454 l and temperature of 40–45° C. until 1820 l permeate was collected.

The retentate was diluted with deionized water to 5% total solids, adjusted to 35° C. and pH 4.6 with 10% NaOH, then mixed for two hours at 35° C. Deionized water was further added to reach 4% total solids. The mixture was passed through an Alfa Laval CHPX-513SGD centrifuge. The precipitate was resuspended in 2 volumes of deionized water and centrifuged through CHPX-513SGD again.

The collected supernatant was adjusted to pH 6.8 with NaOH and concentrated to 25% total solids through ultrafiltration using 10K MWCO membrane and then spray-dried. The powder contained 90.3% protein, 1.8% ash, 2.4% moisture, and 0.6% fat by weight.

The precipitate stream was adjusted to pH 6.5 with NaOH and concentrated to 24% total solids through ultrafiltration using 10K MWCO membrane and then spray-dried. The powder contained 80.1% protein, 1.9% ash, 3.1% moisture, and 11.2% fat by weight. The α-La concentration was 27.5% by weight of the protein.

EXAMPLE 5

Preferred Filtration Process for Manufacture of α-La Concentrate

Cheddar cheese whey was concentrated to 10 VCF through a commercial ultrafiltration plant with 10K molecular weight cut-off membrane. A sample of retentate (200 l) was continuously diafiltered with 20K MWCO membrane while maintaining constant volume of retentate of 200 l until 1200 l permeate was collected.

The pH of the permeate was adjusted to 3.5 with 4N HCl. The pH-adjusted permeate was concentrated through the same membrane (20K MWCO) to 14 l. The pH of the retentate was adjusted to 6.5 with 6N NaOH, concentrated with 10K MWCO membrane to 5 l, and spray-dried. 350 g powder was collected. The powder contained 85% protein, 3.1% ash, 5.5% moisture, and 0.1% by weight fat. The α-La level was 65.0% by weight of the total protein.

EXAMPLE 6

Preferred Filtration Process for Manufacture of α-La Concentrate

Cheddar cheese whey was concentrated to 10 VCF through a commercial ultrafiltration plant with 10K molecular weight cut-off membrane and diafiltered till the protein concentration was 80% of the total solids. 2400 l of the permeate from diafiltration was adjusted to pH 3.5 with 4N HCl and concentrated by ultrafiltration through 20K MWCO membrane to 80 l. The retentate was adjusted to pH 6.5 with 5N NaOH and further concentrated to 27% total solids with 10K MWCO membrane and spray-dried. 750 g powder was collected from ¼ of the retentate. The powder contained 72% protein, 4.4% ash, 4.5% moisture, and 0.6% by weight fat. The α-La level was 37.3% by weight of the protein.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

What is claimed is:

1. An α-lactalbumin enriched whey protein product that is manufactured by a process comprising:

mixing a whey protein product with a sufficient amount of an acid such that the pH of the whey protein product is towered to 4.0 or below; and fractionating the proteins in the acidified whey protein product to produce an α-lactalbumin enriched whey protein product by concentrating the proteins in the acidified whey protein product until the calcium to protein ratio is less than about 0.001 to form a low-calcium whey protein product; and precipitating the α-lactalbumin from the low-calcium whey protein product to form an α-lactalbumin enriched whey protein product, said precipitating step including the substeps of:

diluting the low-calcium whey protein product;

adjusting the pH of the diluted low-calcium whey protein product to a range between about 4.0–5.0 to form precipitated and soluble proteins; and separating the precipitated proteins from the soluble proteins;

whereby the α-lactalbumin enriched whey protein product has a calcium to protein ratio of less than about 0.001.

2. An α-lactalbumin enriched whey protein product according to claim 1 obtained from a bovine milk source.

3. A product comprising:

an α-lactalbumin enriched whey protein product manufactured according to the process comprising:

mixing a whey protein product with a sufficient amount of an acid such that the pH of the whey protein product is lowered to 4.0 or below;

fractionating the proteins in the acidified whey protein product to produce an α-lactalbumin enriched whey protein product by concentrating the proteins in the acidified whey protein product until the calcium to protein ratio is less than about 0.001 to form a low-calcium whey protein product; and precipitating the α-lactalbumin from the low-calcium whey protein product to form an α-lactalbumin enriched whey protein product, said precipitating step including the substeps of:

diluting the low-calcium whey protein product;

adjusting the pH of the diluted low-calcium whey protein product to a range between about 4.0–5.0 to form precipitated and soluble proteins; and separating the precipitated proteins from the soluble proteins;

whereby the α-lactalbumin enriched whey protein product is selected from the group consisting of infant formula, adult nutritional formula, sport formula, medical formula, and enteral formula;

and further providing that the α-lactalbumin enriched whey protein product has a calcium to protein ratio of less than about 0.001.

4. An α-lactalbumin enriched whey protein product according to claim 3 wherein the product is in a form selected from the group consisting of tablets, capsules, powders, suspensions, emulsions, granules, and feed supplements.

\* \* \* \* \*